United States Patent
Lucht et al.

(10) Patent No.: US 9,145,107 B2
(45) Date of Patent: Sep. 29, 2015

(54) BELT TENSIONER DRIVE

(71) Applicant: IMS GEAR GMBH, Donaueschingen (DE)

(72) Inventors: Andreas Lucht, Horst (DE); Matthias Koop, Villingen-Schwenningen (DE)

(73) Assignee: IMS GEAR GMBH, Donaueschingen (DE)

(*) Notice: Subject to any disclaimer, the term of this patent is extended or adjusted under 35 U.S.C. 154(b) by 160 days.

(21) Appl. No.: 13/801,339

(22) Filed: Mar. 13, 2013

(65) Prior Publication Data
US 2013/0334356 A1   Dec. 19, 2013

(30) Foreign Application Priority Data
May 18, 2012   (DE) .......................... 10 2012 208 347

(51) Int. Cl.
*B60R 22/46*   (2006.01)
(52) U.S. Cl.
CPC ......... *B60R 22/46* (2013.01); *B60R 2022/4666* (2013.01)
(58) Field of Classification Search
CPC ........................ B60R 22/46; B60R 2022/4666
USPC .............................................. 242/374, 390.8
See application file for complete search history.

(56) References Cited

U.S. PATENT DOCUMENTS

| 4,546,934 | A | * | 10/1985 | Nishimura et al. | 242/372 |
| 4,592,520 | A | * | 6/1986 | Kawaguchi | 242/372 |
| 4,664,334 | A | | 5/1987 | Asagiri et al. | |
| 5,295,730 | A | * | 3/1994 | Rees | 297/361.1 |
| 8,398,012 | B2 | * | 3/2013 | Lucht et al. | 242/390.8 |

FOREIGN PATENT DOCUMENTS

| DE | 10 2008 048 339 A1 | 9/2008 |
| WO | WO2007/039181 A2 | 4/2007 |

\* cited by examiner

*Primary Examiner* — Sang Kim
(74) *Attorney, Agent, or Firm* — Juneau & Mitchell

(57) ABSTRACT

The invention relates to a belt tightening drive for tightening a safety belt which can be wound up around a winding shaft, said belt tightening drive comprising an electric motor, a spindle shaft and a output wheel coupled with the winding shaft and a worm gear, by way of which the output wheel is driven by the spindle shaft, wherein for the formation of the worm gear an external helical gear of the output wheel is combing with a worm drive supported torsionally rigid on the spindle shaft and it is provided according to the invention that the external gear of the output wheel comprises at least two gear sections, wherein a first gear section comprises a gear with constant geometry and a following second gear section is designed with an increasing root circle diameter and/or increasing tip circle diameter and/or increasing tooth thickness.

10 Claims, 5 Drawing Sheets

BELT TENSIONER DRIVE

CROSS REFERENCE TO RELATED APPLICATIONS

This patent application claims priority German Patent Application 10 2012 208 347.2, filed on May 18, 2012.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

1. Field of the Invention

The invention relates to a belt tightening drive for tightening a safety belt which can be wound up around a winding shaft.

Said type of reversible belt tightening drive is disclosed for example in DE 10 2008 048 339 A1, in which an electric motor is driving a spindle shaft by way of a first gear designed as a spiral gear, said spindle shaft in turn driving an output wheel by way of a second gear, said output wheel being arranged torsionally rigid on a winding shaft for winding up a safety belt. Said second gear is formed by a worm drive arranged on the spindle shaft and an external helical gear of the output wheel.

A reversible belt tightener is activated when necessary, i.e. for example in connection with a minor crash or an impending crash, during off-road journeys and in connection with braking deceleration of the vehicle which brings about the tightening of the safety belt. To maintain the belt tightening in these kinds of situations, a high electric current is used to energize the electric motor which causes an undesirably high strain on the vehicle's supply system.

In the event of a crash, the belt tightener is activated pyrotechnically and represents a full-load tightening resulting in the decoupling of the belt tightener from the electric motor. As a result of the subsequent holding of the safety belt by means of the electrical drive with the residual energy of the electric motor, it is re-coupled onto the belt tightener which can potentially cause impairments in the power limit.

Moreover, said residual energy of the electric motor causes a strain on the vehicle's supply system.

Furthermore, highly dynamic load statuses develop in connection with full load tightening. They result in high turning moments (holding moments) in the output stage of the belt tightener and hence in high gear tooth forces, in particular also in high axial forces in connection with the helical gears of the used gear components, said axial forces causing a deformation of the gear components such as the wheel body and the bearings in the housing of the belt tightener. This means a loss of engagement depth and causes axial relative shifts in the engagement of the gear components, as a consequence of which the active gear width is reduced considerably. The two negative effects result in a substantial reduction of the carrying capacity of the gear components. Moreover, high radial forces develop due to the engagement angle, resulting in shifts and deformations in consequence of which the engagement depth (active depth of teeth) and hence the coverage is reduced. This means a loss in carrying capacity and ultimately leads to damage and mechanical failure of the gearing components.

BACKGROUND OF THE INVENTION

The current state of knowledge is as follows.

The object of the invention is to provide a belt tightening drive of the type mentioned above, in which the reduction of the carrying capacity is at least considerably reduced, but in particular increased in connection with high passive types of loads such as they occur for instance in the event of a crash and which are greater than the active tightening load of the belt tightener.

Said object is solved with a belt tightening drive having the characteristics disclosed herein.

BRIEF SUMMARY OF THE INVENTION

In a preferred embodiment, a belt tightening drive for tightening a safety belt which can be wound up around a winding shaft, comprising (i) an electric motor, a spindle shaft and a output wheel coupled with the winding shaft, and (ii) a worm gear by way of which the output wheel is driven by the spindle shaft, wherein for the formation of the worm gear an external helical gear of the output wheel is combing with a worm drive supported torsionally rigid on the spindle shaft; further comprising wherein the external gear of the output wheel comprises at least two gear sections, wherein a first gear section comprises a gear with constant geometry and a following second gear section is designed with an increasing root circle diameter and/or increasing tip circle diameter and/or increasing tooth thickness.

The belt tightening drive as disclosed, wherein the first gear section comprises a sequel of the root circle diameter following the first gear section, said sequel increasing based on the root circle diameter of the first gear section toward a front face of the output wheel to a value of the tip circle diameter of the first gear section.

The belt tightening drive as disclosed, wherein the second gear section is designed as an enveloping gear.

The belt tightening drive as disclosed, wherein second gear section is designed as an enveloping gear with a root circle diameter and tip circle diameter starting from the root circle diameter and the top circle diameter of the first gear section and increasing to a defined value.

The belt tightening drive as disclosed, further comprising wherein the spindle shaft is supported on a spring elastic bearing having a defined spring stiffness such that if the worm gear is operated in forward direction, the worm drive is mechanically linked with the first gear section of the output wheel and if the worm gear is operated in reverse direction under a passive holding load, the worm drive establishes a mechanical link with the second gear section of the output wheel.

The belt tightening drive as disclosed, further comprising wherein the bearing is supported on a spring elastic component, preferably a spring element.

The belt tightening drive as disclosed, further comprising wherein a gear is provided by way of which the spindle shaft is driven by the electric motor.

DETAILED DESCRIPTION OF THE INVENTION

Figure 1:
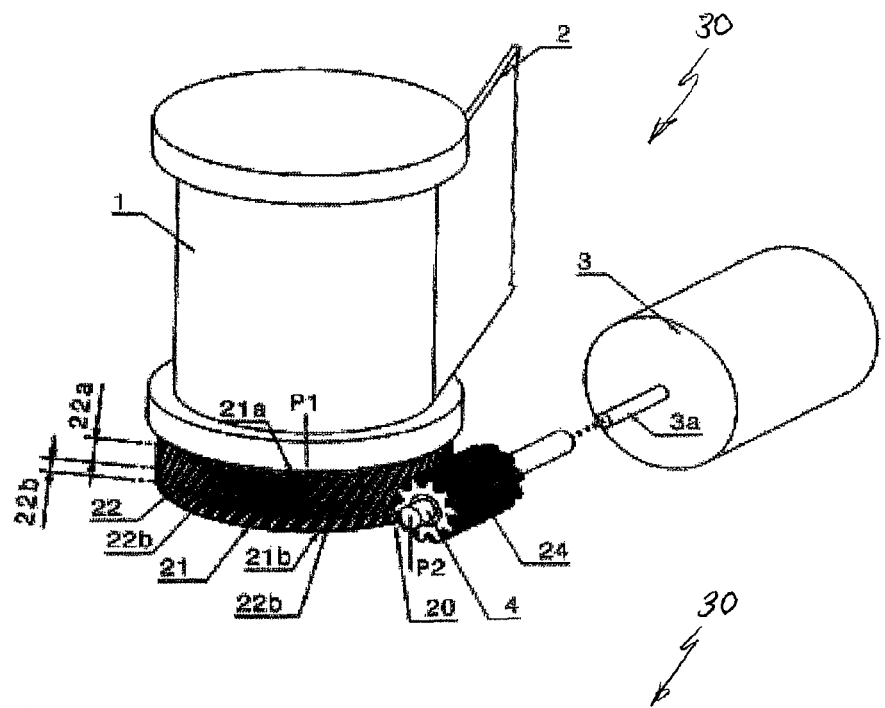
FIG. 1 shows a schematic perspective representation of a belt tightening drive having a worm gear driven by an electric motor as exemplary embodiment of the invention.

The invention is a type of belt tightener for tightening a safety belt which can be wound up around a winding shaft is characterized based on the invention in that the external gear of the output wheel comprises at least two gear sections, wherein a first gear section comprises a cylindrical gear having a constant geometry and a following second gear section is designed with an increasing root circle diameter and/or increasing tip circle diameter and/or increasing tooth thickness.

This achieves that in the driving direction (forward direction) of the worm gear, the first gear section is combing with the worm drive and that in a reverse direction of the second gear driven by the output wheel, the axial forces generated in this fashion help establish a mechanical linkage between the second gear section and the worm drive because of deformations.

With the solution according to the invention, the second gear section is mounted on the output wheel such that in the event of high passive loads, which occur on the output wheel for instance in the event of a crash and which are greater than the active tightening force of the belt tightening drive, said second gear section is pushed toward the worm drive such that a mechanical jamming linkage is created between the output wheel and the worm drive. This increases the power transmission and coverage surface between the two gears of the output wheel and the worm drive, as a result of which the axial and radial forces occurring in the output wheel are absorbed by the worm drive which is acting as load support and hence the strain on the bearings of the output stage decreases. Hereby, the carrying capacity of the gear of the output wheel and the worm drive is increased.

Furthermore, the mechanical linkage between the worm drive and the second gear section results in an increase in the friction between the output wheel and the worm drive such that the consequently decreasing efficiency in connection with a reverse direction of the worm drive gear driven by the output wheel analogously also requires a reduced holding force to be supplied by the electric motor, meaning that a lower electric current is sufficient for energizing the electric motor. As a result, the electrical holding function for holding the safety belt in connection with a high load can be realized with a lower holding current of the electric motor. Consequently, the passive load suspension increases starting from the first gear section to the second gear section as a result of the changing tooth geometry.

This simple and surprising solution according to the invention utilizes the knowledge that a mechanical system which is in particular using synthetic materials, such as a belt tightening drive, inevitably shows deformations under the application of load, which are utilized functionally according to the invention. The external helical gear of the second gear results in axial forces which are dependent on the direction of thread of the external gear, and the output wheel is pushed in the position created by the deformation of the system such that in this position the second gear section establishes a mechanical combing linkage with the gearing of the worm drive, wherein the axial forces between the output wheel and the worm drive result in the jamming of the worm drive because of the increasing root circle diameter and/or the increasing tip circle diameter and/or the increasing tooth thickness of the second gear section.

An output wheel of the belt tightening drive according to the invention having an external helical gear comprising two gear sections is easy to manufacture, e.g. in the form of an extruded plastic part. This helps keep the manufacturing costs of the belt tightening drive according to the invention low, because only said output wheel according to the invention has to be created.

According to one embodiment of the invention, the second gear section comprises a sequel of the root circle diameter following the first gear section, said sequel of the root circle diameter increasing starting from the root circle diameter of the first gear section toward a face of the output wheel to essentially a value of the tip circle diameter of the first gear section.

On the one hand, this achieves a continuous transition from the first gear section to the second gear section and on the other hand, the generated jamming forces between the output wheel and the worm drive are optimally matched to the loads occurring in the output stage when the second gear is operated in reverse direction.

A particularly advantageous upgrade of the invention is achieved in that the second gear section is designed as an enveloping worm. As a result, the tooth depth in the region of said second gear section increases in a circular arc-shaped manner and causes an increase of the jamming forces in connection with a rising occurrence of axial forces on the output wheel.

Alternatively, the enveloping worm gear of the second gear section can be designed with a root circle diameter and tip circle diameter increasing to a specified value based on the root circle diameter and the tip circle diameter of the first gear section.

In a further embodiment of the invention, the spindle shaft is supported on a spring elastic bearing having a defined spring stiffness such that if the worm gear is operated in forward direction, the worm drive is mechanically linked with the first gear section of the output wheel and if the worm gear is operated in reverse direction, the worm drive is mechanically linked with the second gear section of the output wheel under a passive holding load.

The elastic forces applied by the spring elastic bearing counteract the axial gear tooth forces. This results in an increase in friction and hence in a reduction of the efficiency of the output stage, as a result of which the required holding current on the electric motor can be reduced.

Consequently, the result of said spring elastic support of the spindle shaft is that a high efficiency is achieved in connection with the use of a belt tightener, i.e. in connection with a tightening force generated by the electric motor and the resulting tightening of the safety belt, in which the worm gear is operated in forward i.e. driving direction, whereas in contrast, the efficiency is as low as possible in connection with a worm gear operated in reverse direction with a passive holding moment which is greater than the moment in which tightening of the safety belt still occurs, such that the electric motor is only required to generate a small holding moment for holding the safety belt, and hence only a low holding current is required for this purpose and the vehicle's supply system is only exposed to minor strain as a result.

This means that the electric current for the generation of the holding moment can be reduced to the point where it is possible to hold the safety belt in a tightened status with a high holding moment for an extended period of time without exposing the supply system of the vehicle to excessive strain.

According to an upgrade of the invention, the bearing is preferably supported on a spring elastic component, preferably a spring element, thus allowing the simple realization.

Finally, according to a last embodiment of the invention, a gear is provided by way of which the spindle shaft is driven by the electric motor. As a result, two gears are connected in series such that a lower driven efficiency is achieved.

DETAILED DESCRIPTION OF THE FIGURES

Figure 2:
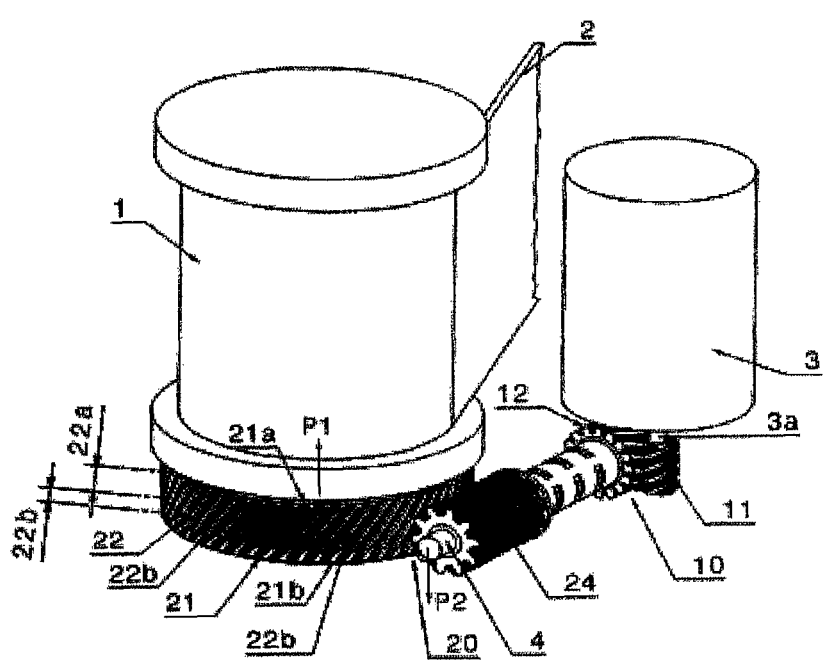
FIG. 2 shows a schematic perspective representation of a belt tightening drive having a worm gear driven by an electric motor as exemplary embodiment of the invention, shows a schematic perspective representation of a belt tightening drive having a worm gear, which is driven by an electric motor as a further exemplary embodiment of the invention.
Figure 4:
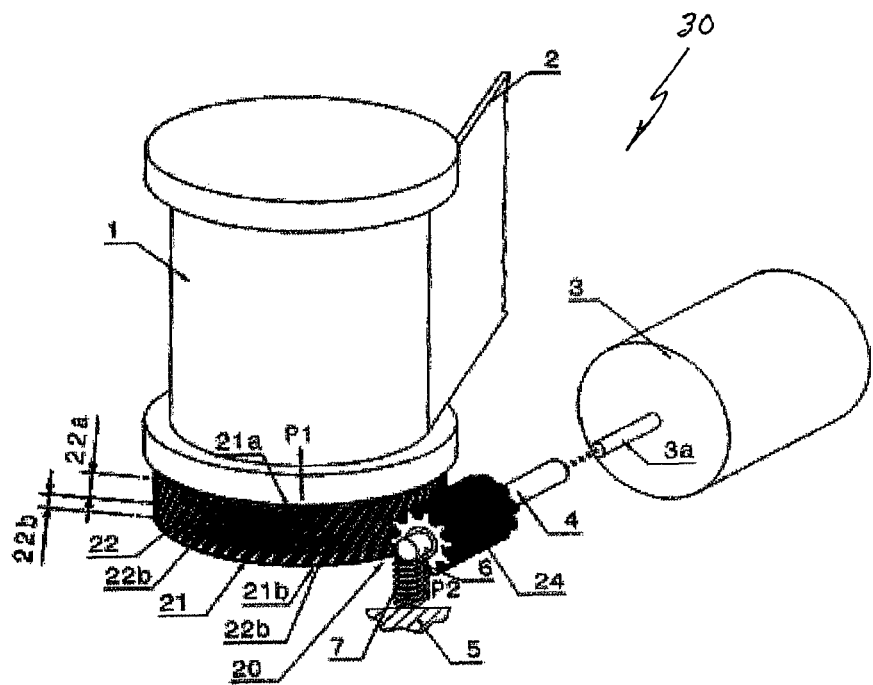
FIG. 4 and shows a schematic representation of the belt tightening drive according to FIG. 1 having a spring elastically supported spindle.

The belt tightening drive 30 according to the FIGS. 1, 2 and 4 is in each case only illustrated with the parts that are most essential for the understanding of the invention, in part only these parts.

The belt tightening drive 30 according to FIG. 1 comprises an electric motor 3, whose motor shaft 3a for driving a worm gear 20 is coupled directly with a spindle shaft 4 to drive a winding shaft 1 for tightening, i.e. winding up a safety belt 2.

In contrast, based on the belt tightening drive 30 according to FIG. 2, the worm gear 20 is driven by the electric motor 3 by way of a gear 20. The gear 10 is designed as a worm gear having a worm drive 11 arranged torsionally rigid on a motor shaft 3a of the electric motor 3 and an associated worm wheel 12 rigidly mounted on the spindle shaft 4.

A housing of the belt tightening drive 30 is not illustrated in the FIGS. 1 and 2.

The worm gear 20 comprises a worm drive 24 arranged torsionally rigid on the spindle shaft 4 as well as an output wheel 21 combing with the worm drive, said output wheel comprising an external helical gear 22. Said output wheel 21 is connected with the winding shaft 1 by means of a coupler.

Figure 3:
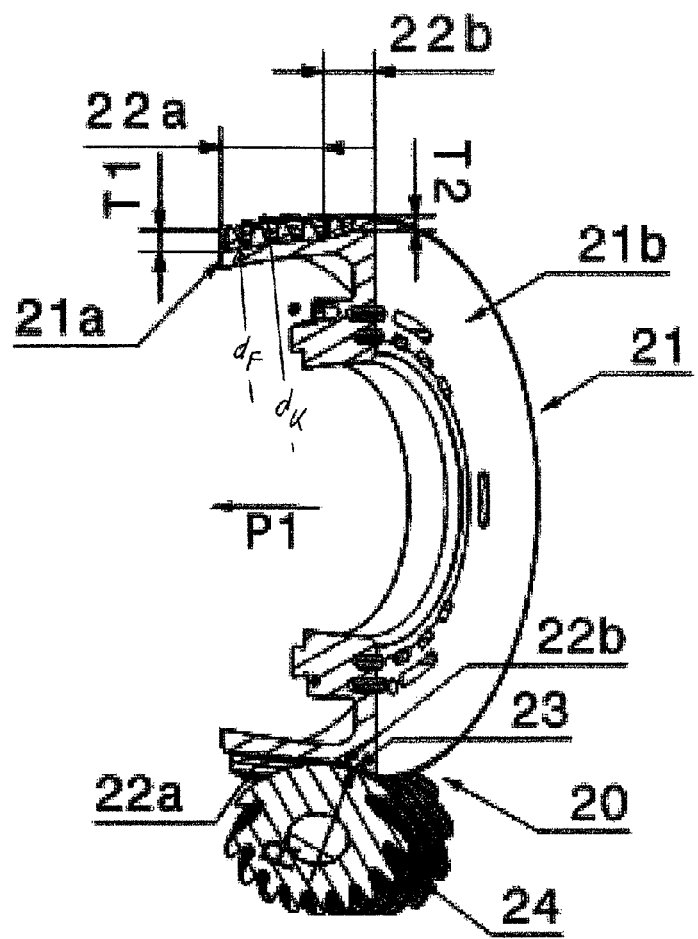
FIG. 3 shows a cross-sectional representation of the output wheel and the worm drive in normal section corresponding to section I-I according to FIG. 1 and FIG. 2.

According to FIGS. 1, 2 and 3, the helically geared external gear 22 consists of two gear sections, a first gear section 22a and a second gear section 22b having different gear types.

The first gear section 22a starting on a front face 21a of the output wheel 21 comprises a cylindrical gear with constant gear geometry. Said type of constant gear geometry is characterized by a constant depth of teeth T1, which corresponds to a constant root circle diameter dF and a constant tip circle diameter dK (cp. FIG. 2).

The second gear section 22b which has a continuously decreasing depth of teeth T2 and continuously increasing root circle diameter dF is provided following said first gear section 22a, wherein the tip circle diameter dK is unchanged compared to the one of the first gear section 22a, and extends to the opposite front face 21b. According to FIG. 3a, said second gear section 22b is designed and clearly recognizable as an enveloping gear in the lower part of the cross-sectional representation according to FIG. 3, said part depicting the engagement between the gearing of the worm drive 24 and the enveloping gear of the second gear section 22b.

Figure 3A:
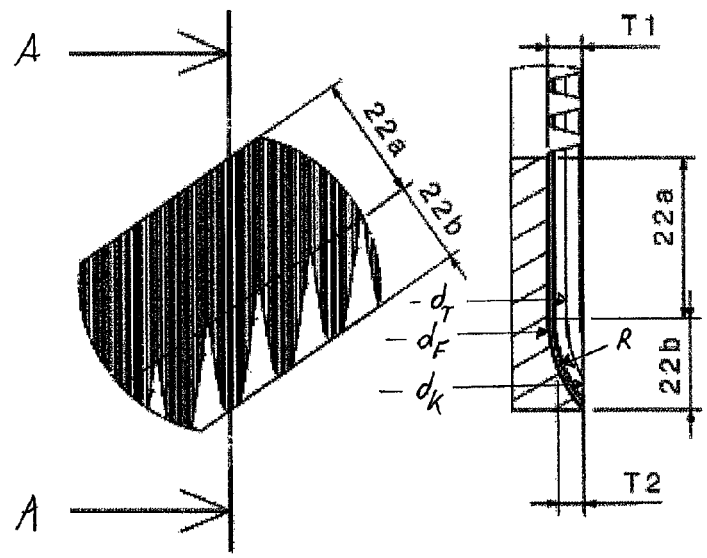
FIG. 3a shows an enlarged top view and an enlarged cross-sectional representation of the gearing of the output wheel used in the belt tightening drive according to the FIGS. 1 and 2 having an enveloping second gear section.

The section A-A according to FIG. 3a extends between two teeth of the second gear section 22b and illustrates its circular arc-shaped sequel of the root circle diameter dF which is also labeled with the reference number 23, wherein the associated radius R is considerably larger than the depth of teeth T1 of the cylindrical gear 22a. For the enveloping gear, not only the root circle diameter dF is circular arc-shaped, but the base circle diameter or the reference circle diameter dT is as well.

The transition between the cylindrical gear of the first gear section 22a and the enveloping gear of the second gear section 22b is continuous, i.e. the enveloping gear 22b starts with a depth of teeth T2 corresponding to the depth of teeth T1 and essentially decreases to the value zero toward the front face 21b of the output wheel 21, wherein the radius of the top of the tooth dK remains constant across the entire width of the gearing of the output wheel 21.

The gearing 22 of the output wheel 21 can be split into the two gear sections 22a and 22b such that the enveloping gear 22b essentially amounts to one third of the frontal width of the output wheel 21.

The function of the belt tightening drive 30 is explained below.

To create a tightening force for tightening the safety belt 2, the arrangement having the worm gear 10 (cp. FIG. 1) or the arrangement having the worm gear 10 and the gear 20 (cp. FIG. 2) is operated in forward direction such that the worm drive 24 of the worm gear 20 is combing with the cylindrical gear of the first gear section 22a of the output wheel 21 such as to ensure a high driving efficiency. This represents the nominal position of the worm gear 20.

After the safety belt 2 has been tightened by the electric motor 3, a high pressure is applied onto the safety belt 2 to keep the vehicle's passenger in a certain position. Said pressure applied onto the output wheel 21 is attempting to the worm gear 20 (and obviously also the gear 10 in case of the belt tightening drive 30 according to FIG. 2) in reverse direction.

Axial forces develop at the output wheel 21 due to the helical gear of the worm gear 20, whose direction is dependent on the direction of thread of the helical gear. According to the FIGS. 1, 2 and 3, said direction of thread is selected such that the emerging axial forces can push the output wheel 21 in the direction indicated with an arrow P1, such that it is no longer the cylindrical gear 22a that is combing with the worm drive 24, but the enveloping gear of the gear section 22b engages in a jamming gear with the worm drive 24, which brings about a considerable reduction of the efficiency of the second gear 20 operated both in reverse direction as well as in forward direction. The efficiency is gradually reduced as a result of said change of the worm gear 20 from its nominal position to an engaging position with the enveloping gear.

The power transmission and coverage surface between the enveloping gear 22b of the output wheel 21 and the gearing of the worm drive 24 increases as a result, and the axial and radial forces occurring on the output wheel 21 are absorbed by the worm drive 24 which is acting as load support. The passive load suspension of the belt transfer drive 30 increases because of the changed tooth geometry of the enveloping gear 22b.

The resulting reduced efficiency in connection with a reverse direction of the second gear 20 driven by the output wheel 21 therefore also requires a reduced holding force of the electric motor 3, i.e. the power supply with a reduced amperage. Consequently, the electrical holding function for holding the safety belt in connection with a high load can be realized with a low holding current of the electric motor 3.

In the exemplary embodiments according to the FIGS. 1, 2, 3, and 3a, the jamming between the output wheel 21 and the gearing of the worm drive 24 is achieved by means of an enveloping gear of the second gear section 22b to support high passive holding forces. Said type of jamming can also be achieved with other gear geometries of the second gear section 22b and with modifications of the enveloping gear, as explained below based on the FIGS. 3b and 3e.

Figure 3B:
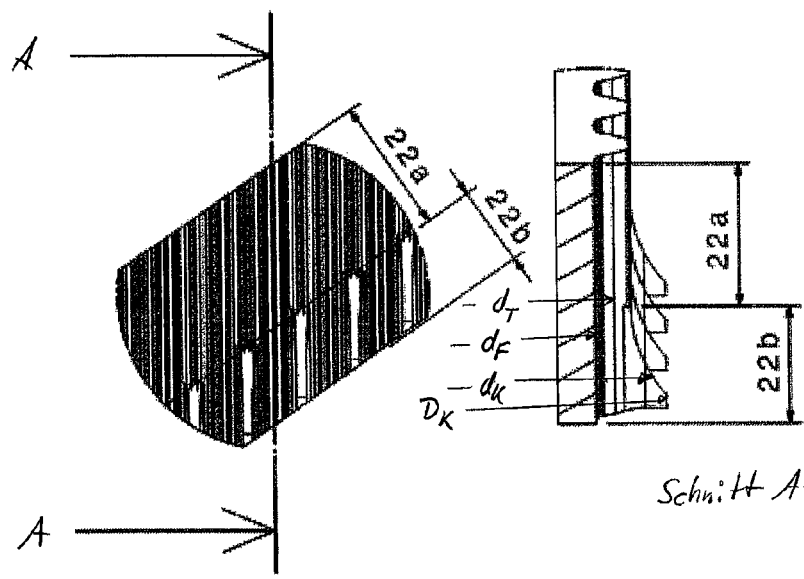
FIG. 3b shows an enlarged top view and an enlarged cross-sectional representation of the gearing of the output wheel used in the belt tightening drive according to the FIGS. 1 and 2 with increasing tip circle diameter of the second gear section.

For instance, FIG. 3b shows a gearing of the second gear section 22b in which the addendum and/or the dedendum gradually increases to a specified value DK, i.e. according to FIG. 3b, the tip circle radius increases in a circular arc-shaped form to said defined value DK based on the one of the first gear section 22a.

Figure 3C:
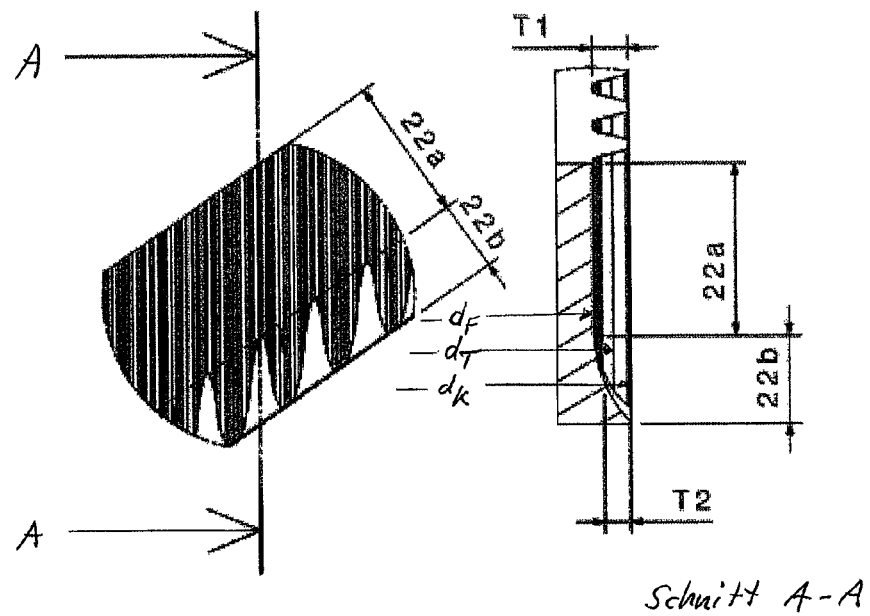
FIG. 3c shows an enlarged top view and an enlarged cross-sectional representation of the gearing of the output wheel used in the belt tightening drive according to the FIGS. 1 and 2 with enlarged root circle diameter of the second gear section.

FIG. 3c illustrates a modification of an enveloping gear, in which both the tip circle diameter as well as the base circle diameter and the reference circle diameter are continued with the values of the first gear section 22a in the second gear section 22b, but only the root circle diameter dF increases in a circular arc-shaped fashion to a value that corresponds to the tip circle diameter, wherein this corresponds to a continuous decrease of the depth of teeth T2, starting from the depth of teeth T1 of the first gear section 22a to a value zero.

Figure 3D:
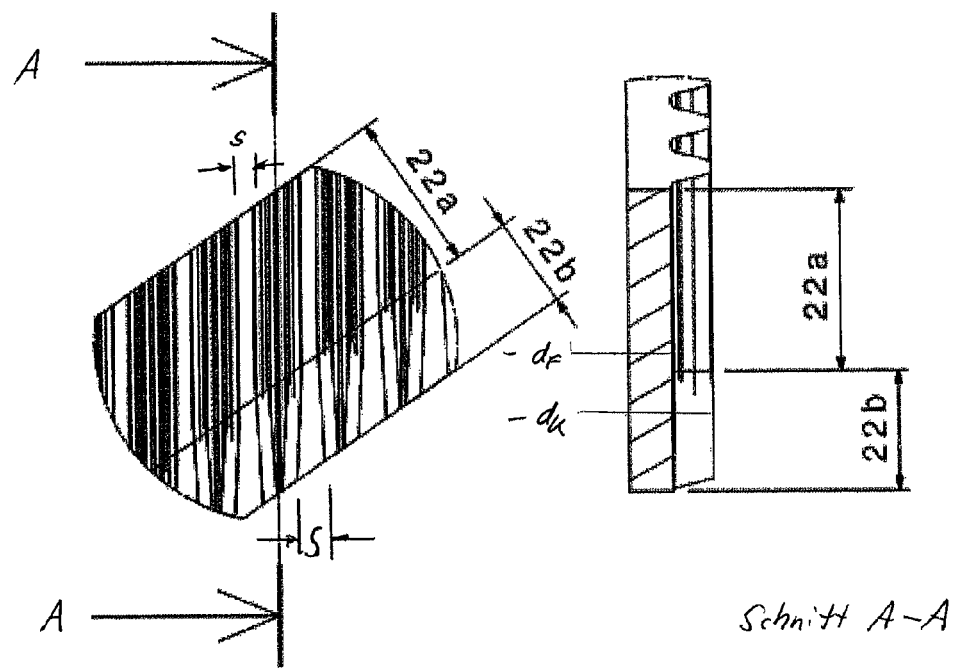
FIG. 3d shows an enlarged top view and an enlarged cross-sectional representation of the gearing of the output wheel used in the belt tightening drive according to the FIGS. 1 and 2 with increasing tooth thickness of the second gear section.

A further possibility to achieve the self-locking of the output wheel 21 in a mechanical linkage with the worm drive 24 can be realized with a gear geometry of the second gear section according to FIG. 3d. Accordingly, the tooth thickness s of the first gear section 22a increases across the second gear section 22b to a value S.

Figure 3E:
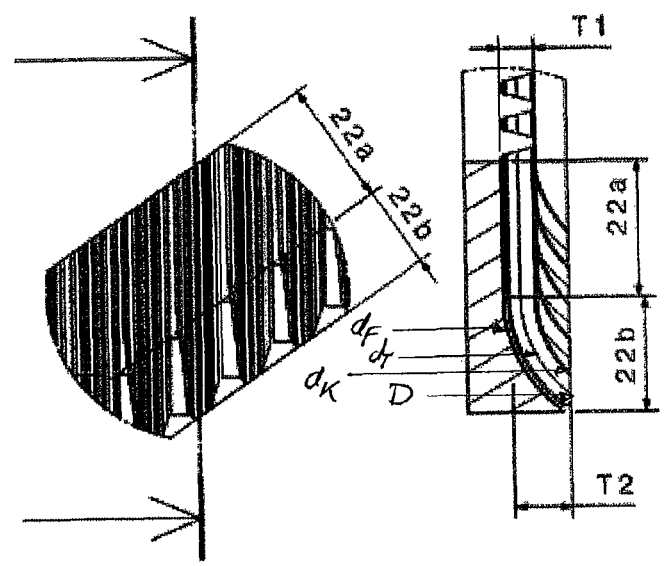
FIG. 3e shows an enlarged top view and an enlarged cross-sectional representation of the gearing of the output wheel used in the belt tightening drive according to the FIGS. 1 and 2 with increasing tooth thickness of the second gear section, shows an enlarged top view and an enlarged cross-sectional representation of the gearing of the output wheel used in the belt tightening drive according to the FIGS. 1 and 2 with an enveloping gear without decreasing depth of teeth of the second gear section.

Finally, FIG. 3e illustrates an enveloping gear geometry of the second gear section 22b, which continues in an envelope-shaped fashion across the second gear section 22b based on the root circle diameter dF, the base circle and the reference circle diameter dT and the tip circle diameter dK, such that the mentioned sizes dF, dT and dK finish with a defined common value D. Compared to the enveloping gear according to FIGS. 3 and 3a, said gear is designed without a decreasing depth of teeth.

The gear geometries for the second gear section 22b mentioned above can each be used alone or in combination or mixed. It is basically sufficient if the second gear section 22b is designed either with an increasing root circle diameter or with an increasing tip circle diameter or with an increasing depth of teeth, wherein it has been proven advantageous if two of these sizes are combined for the gear geometry of the second gear section 22b.

FIG. 4 illustrates a further exemplary embodiment of the belt tightening drive 30 according to the invention which has the same design as the belt tightening drive 30 according to FIG. 1, but in which the spindle drive 4 is additionally supported in a spring elastic fashion. This is realized by means of a bearing 6 which is propped up against a housing part 5 of a housing by means of a spring element 7.

The spring stiffness of the spring element 7 is set as defined, such that in connection with a certain passive load applied onto the output wheel 21 which is greater than the generated active tightening load, i.e. in connection with a moment which is greater than the moment required for an electric tightening, the spindle axis 4 is pushed in one direction P2, i.e. parallel to the axis of the winding shaft 1 due to the gear tooth forces of the worm gear 20 developing under said type of moment, such that the gearing of the worm drive 24 is pushed to the enveloping gear of the second gear section 22b as a result, thus creating a jamming gear with the consequence that the driven efficiency decreases depending on the generated jamming force.

Consequently, in the forward operation in which the gearing of the worm drive 24 is combing with the cylindrical gear of the first gear section 22a of the output wheel 21, a certain tightening force with a high efficiency is generated for tightening the safety belt, said tightening force being dependent on the helix angle of the helix gears. In connection with a higher passive holding force which is set with the spring stiffness of the spring element 7, a lower driven efficiency is achieved such that part of the passive holding force is supported by the worm drive 24 and the electric motor is only required to generate a small part of said holding force with a low electric current.

The jamming between the worm drive 24 and the second gear section 22b can only be resolved by energizing the electric motor 3 in the opposite direction, as a result of which the worm drive 24 virtually "rolls back" into the first gear section 22a with the cylindrical gear 22a and the spindle shaft 4 thus moving back to its original position.

LIST OF REFERENCE NUMBERS

1 Winding shaft
2 Safety belt
3 Electric motor
3a Motor shaft of the electric motor 3
4 Spindle shaft
5 Housing part of a housing
10 Gear
11 Worm drive of the gear 10
12 Worm wheel of the gear 10
20 Worm gear
21 Output wheel
21a Front face of the output wheel 21
21b Front face of the output wheel 21
22 External gear of the output wheel
22a First gear section of the external gear 22
22b Second gear section of the external gear 22
23 Root circle diameter of the second gear section 22b
24 Worm drive
30 Belt tightening drive The references recited herein are incorporated herein in their entirety, particularly as they relate to teaching the level of ordinary skill in this art and for any disclosure necessary for the commoner understanding of the subject matter of the

We claim:

1. A belt tightening drive for tightening a safety belt which can be wound up around a winding shaft, comprising (i) an electric motor, a spindle shaft and an output wheel coupled with the winding shaft, and (ii) a worm gear by way of which the output wheel is driven by the spindle shaft, wherein for the formation of the worm gear an external helical gear of the output wheel is combing with a worm drive supported torsionally rigid on the spindle shaft; further comprising wherein the external gear of the output wheel comprises at least two gear sections, wherein a first gear section comprises a gear with constant geometry and a following second gear section is designed with an increasing root circle diameter, and wherein the second gear section is mounted on the output wheel such that in the event of high passive loads, said second gear section, including the increasing root circle diameter, is pushed toward the worm drive such that a mechanical jamming linkage is created between the output wheel and the worm drive.

2. The belt tightening drive of claim 1, wherein the first gear section comprises a sequel of the root circle diameter following the first gear section, said sequel increasing based on the root circle diameter of the first gear section toward a front face of the output wheel to a value of the tip circle diameter of the first gear section.

3. The belt tightening drive of claim 1, wherein the second gear section is designed as an enveloping gear.

4. The belt tightening drive of claim 1, wherein second gear section is designed as an enveloping gear with a root circle diameter and tip circle diameter starting from the root circle diameter and the top circle diameter of the first gear section and increasing to a defined value.

5. The belt tightening drive of claim 4, further comprising wherein the bearing is supported on a spring elastic component.

6. The belt tightening drive of claim 5, further comprising wherein the bearing is supported on a spring element.

7. The belt tightening drive of claim 1, further comprising wherein the spindle shaft is supported on a spring elastic bearing having a defined spring stiffness such that when the worm gear is operated in forward direction, the worm drive is mechanically linked with the first gear section of the output wheel and if the worm gear is operated in reverse direction under a passive holding load, the worm drive establishes a mechanical link with the second gear section of the output wheel.

8. The belt tightening drive of claim 1, further comprising wherein a gear is provided by way of which the spindle shaft is driven by the electric motor.

9. The belt tightening drive of claim 1, wherein the second gear section is designed with an increasing tip circle diameter.

10. The belt tightening drive of claim 1, wherein the second gear section is designed with an increasing tooth thickness.

* * * * *